United States Patent
Levesque

(10) Patent No.: US 11,148,828 B2
(45) Date of Patent: Oct. 19, 2021

(54) TAPE ELEVATION ADJUSTMENT DEVICE FOR AIRCRAFT ARRESTING SYSTEMS

(71) Applicant: Engineered Arresting Systems Corporation, Aston, PA (US)

(72) Inventor: Christopher Levesque, Glenolden, PA (US)

(73) Assignee: ENGINEERED ARRESTING SYSTEMS CORPORAITON, Aston, PA (US)

( * ) Notice: Subject to any disclaimer, the term of this patent is extended or adjusted under 35 U.S.C. 154(b) by 265 days.

(21) Appl. No.: 16/290,494

(22) Filed: Mar. 1, 2019

(65) Prior Publication Data

US 2019/0308747 A1 Oct. 10, 2019

Related U.S. Application Data

(60) Provisional application No. 62/654,878, filed on Apr. 9, 2018.

(51) Int. Cl.
*B64F 1/02* (2006.01)

(52) U.S. Cl.
CPC ............... *B64F 1/02* (2013.01); *B64F 1/027* (2020.01); *B64F 1/029* (2020.01)

(58) Field of Classification Search
CPC ..... B64F 1/029; B64F 1/027; B64C 2201/182
See application file for complete search history.

(56) References Cited

U.S. PATENT DOCUMENTS

| 2,967,683 | A | * | 1/1961 | Crater | B64F 1/029 244/110 A |
|---|---|---|---|---|---|
| 3,220,216 | A | * | 11/1965 | Byrne | B64F 1/029 244/63 |
| 3,589,651 | A | | 6/1971 | Niemkiewicz et al. | |
| 3,604,665 | A | * | 9/1971 | Jamison | B64F 1/0299 244/110 A |
| 3,620,489 | A | | 11/1971 | Riblett | |
| 3,695,559 | A | * | 10/1972 | Cruger | B64F 1/029 244/110 C |

(Continued)

FOREIGN PATENT DOCUMENTS

| FR | 2090153 | 1/1972 |
| GB | 840540 | 7/1960 |
| WO | 2019199390 | 10/2019 |

OTHER PUBLICATIONS

International Patent Application No. PCT/US2019/020366, International Search Report and Written Opinion, dated May 24, 2019.

*Primary Examiner* — Richard R. Green
*Assistant Examiner* — Madison Elizabeth Dittner
(74) *Attorney, Agent, or Firm* — Kilpatrick Townsend & Stockton LLP

(57) ABSTRACT

Embodiments relate to aircraft arresting systems that use a net or a cable that extends across a section of a runway. Ends of the net or cable are secured to an elongated tape, which is secured to and forms a part of an energy absorbing brake system. The elongated tape is secured around a tape reel and is allowed to reel out (or "pay out") once the aircraft is engaged. Described is a system for adjusting the height of the tape such that its elevation can be altered between the point at which it leaves the energy absorbing brake system and when it reaches the aircraft runway.

12 Claims, 6 Drawing Sheets

(56) References Cited

U.S. PATENT DOCUMENTS 3,737,123 A * 6/1973 Carnevale ............... B64F 1/029
                                                     244/110 A
4,809,933 A * 3/1989 Buzby .................... B64F 1/029
                                                     244/110 C

* cited by examiner

TAPE ELEVATION ADJUSTMENT DEVICE FOR AIRCRAFT ARRESTING SYSTEMS

CROSS REFERENCE TO RELATED APPLICATIONS

This application claims the benefit of U.S. Provisional Application Ser. No. 62/654,878 filed Apr. 9, 2018, titled "Tape Elevation Adjustment Device for Aircraft Arresting Systems," the entire contents of which are hereby incorporated by reference.

FIELD OF THE DISCLOSURE

Embodiments relate to aircraft arresting systems that use a net or a cable that extends across a section of a runway. Ends of the net or cable are secured to an elongated tape, which is secured to and forms a part of an energy absorbing brake system. The elongated tape is secured around a tape reel and is allowed to reel out (or "pay out") once the aircraft is engaged. In one example of use, a tailhook of the aircraft engages the cable and the tape pays out from the reel in order to safely decelerate the aircraft. In another example, the aircraft is decelerated by a net extending across the runway. In either option, an energy absorbing brake system can be used to manage the extension of the net or cable. Described is a system for adjusting the height of the tape such that its elevation can be altered between the point at which it leaves the energy absorbing brake system and when it reaches the aircraft runway.

BACKGROUND

An aircraft arresting system of the type illustrated by FIG. 1 is used to decelerate an aircraft by catching the aircraft with a net or by providing a cable that is engaged by the tailhook of an aircraft. Such aircraft arresting systems are needed on runways (commercial or military) where aircraft, approved for use of the system, can engage the cable or net to bring the aircraft safely to a stop. This safe stop is provided at a designed distance based on a variety of aircraft weights and landing velocities. During aircraft engagement, a dynamic wave of energy is sent though the cable or net and is transmitted to an elongated tape (which is positioned on either end of the cable) through a connector. This dynamic wave of energy travels through the runway edge sheave and dampens as is travels towards the energy absorbing braking system, which is set back a set distance from the runway edge sheave.

In use, the elongated tape should be positioned vertically (e.g., perpendicular to the ground). But in some designs, particularly those for which the braking system is set far back from the runway, the tape is initially wound around the reel in a horizontal direction, so it must be rotated from horizontal to vertical for optimal use. This may be done via the runway edge sheave. However, although there are components in place to change the alignment of the tape from horizontal to vertical, they are not sufficient components in the current market that allow adjustment of the tape elevation as it proceeds through the system. Any available tape elevation adjustment options are components that are not stand-alone features that can be incorporated into an existing system. Accordingly improvements to such aircraft arresting system components are desirable.

BRIEF SUMMARY

Embodiments of the invention described herein thus provide systems and methods for adjusting the elevation of tape as it extends through an aircraft arresting system.

In some examples, there is provided a tape elevation adjustment device for use with an aircraft arresting system, comprising: a housing; first and second horizontal sheave rollers positioned within the housing; a tape entrance area and a tape exit area; wherein tape enters the tape entrance area at a first elevation and exits the tape exit area at a second elevation. The tape may travel between the first and second horizontal sheave rollers. The first and second sheaves may function to adjust the elevation of the tape and redirect the tape path. The device may be positioned with respect to an energy absorbing braking system and a runway edge sheave. The device provides the ability to adjust the inclination of the tape with respect to the energy absorbing braking system and the runway edge sheave. In use, the tape is twisted from horizontal to vertical at any point between the energy absorbing braking system, the tape elevation adjustment device, and the runway edge sheave.

The first and second horizontal sheave rollers comprise an upper sheave roller and a lower sheave roller. The upper sheave roller generally prevents the tape from lifting up off of the lower horizontal sheave roller. It is also possible to provide the device with a mounting plate. A further addition may be an additional anchoring feature configured to be anchored to soil for a mobile installation. The additional anchoring feature may comprise a soil install mounting plate and one or more stakes.

It is possible to retrofit the device into an existing aircraft arresting system by positioning the tape elevation adjustment device between an existing energy absorbing braking system and an existing runway edge sheave. Alternatively, it is possible for the device to be installed into a new aircraft arresting system.

DETAILED DESCRIPTION

The disclosed tape elevation adjustment device is a stand-alone horizontal sheave that can be added to the back of an existing sheave foundation. The device solves existing tape tracking issues by redirecting the elevation of the tape from an energy absorbing braking system to an existing runway edge sheave. Over the course of time or from improper installation, existing runway edge sheave(s) can experience tape tracking issues. In one example, the disclosed tape elevation adjustment device can be installed onto the back of the foundation or behind the existing foundation to redirect the elevation of the tape, allowing it to achieve optimal tape payout. It allows for adjustment of the tape without the need for replacing the existing runway edge sheave or foundation, allowing for retrofits of previously installed runway edges sheaves. In another example, the disclosed tape elevation adjustment device can be placed behind the existing runway edge sheave. In further examples, the disclosed tape elevation adjustment device can be used with new installations. It provides the ability to redirect the tape elevation, allowing the new installation to be completed with a new or already in use runway edge sheave.

Figure 1:
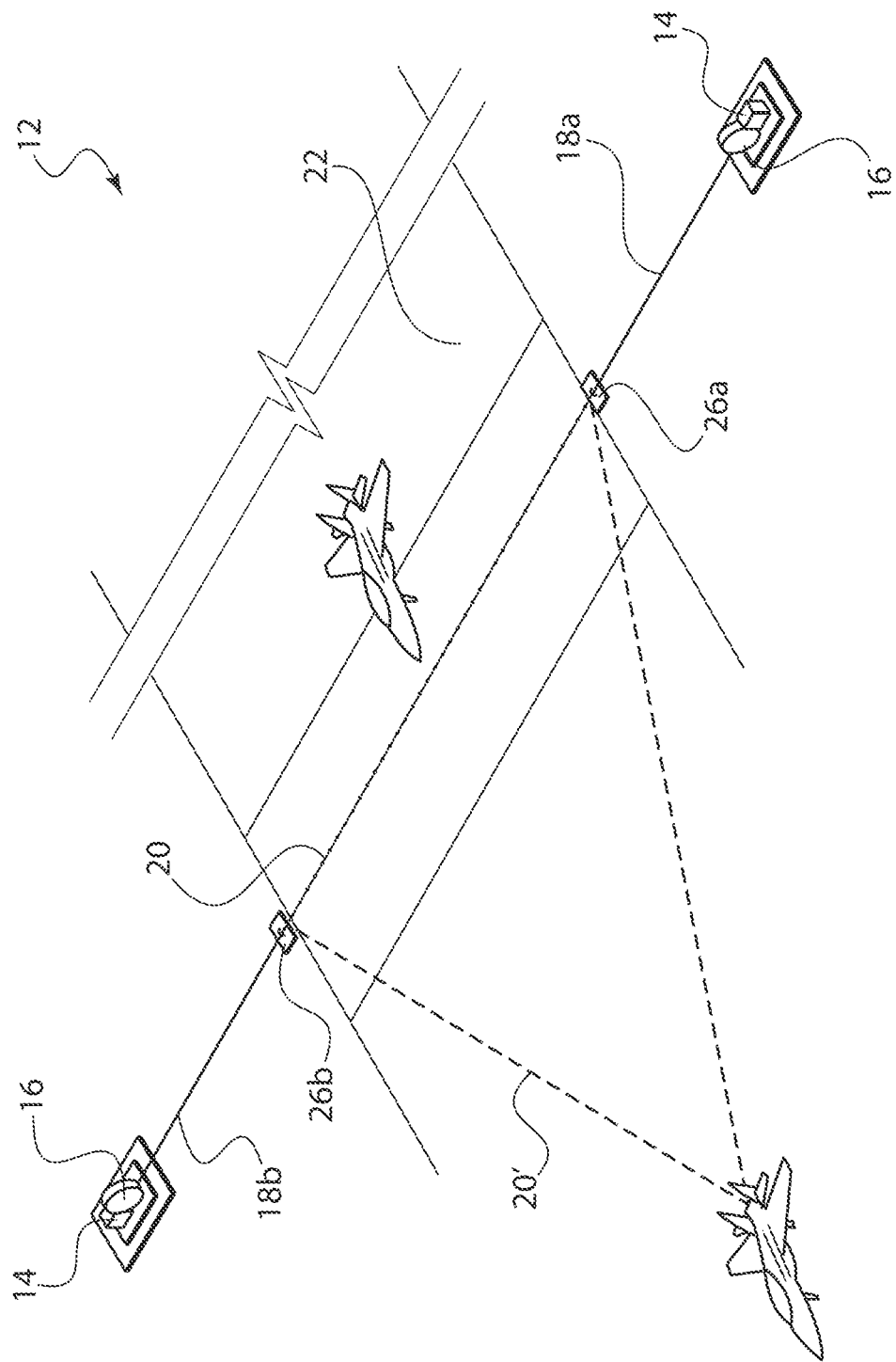
FIG. 1 shows a perspective view of one example of an aircraft arresting system.

Embodiments of the present invention provide a tape elevation adjustment device that finds particular use with aircraft arresting systems. As background, the aircraft arresting systems described herein generally use a cable or a net secured to a tape that is run through a runway edge sheave to a tape reel on a braking system 14. Referring now to FIG. 1, the aircraft arresting system 12 includes an energy absorbing braking system 14 with a tape reel 16 around which the elongated tape 18 (also referred to herein simply as "tape") is wound. One end of the tape 18 remains secured to the reel 16. The body of the tape 18 is wound around the tape reel 16 and run through a runway edge sheave 26, and the other end of the tape 18 is secured to a cable 20 or a net (not shown).

FIG. 1 also illustrates a cable 20 extending across the runway 22 (and as captured via the tailhook in dotted lines 20'). A first cable end is secured to a first tape 18*a* (associated with one side of the runway), and second cable end is secured to a second tape 18*b* (associated with the other side of the runway). The body of cable 20 extends across the runway 22. Cable 20 is configured to be engaged by a tailhook of the aircraft to be decelerated. Cable 20 can be extended as is shown by 20', due to payout of the tape 18 from the energy absorbing braking system 14.

Figure 2A:
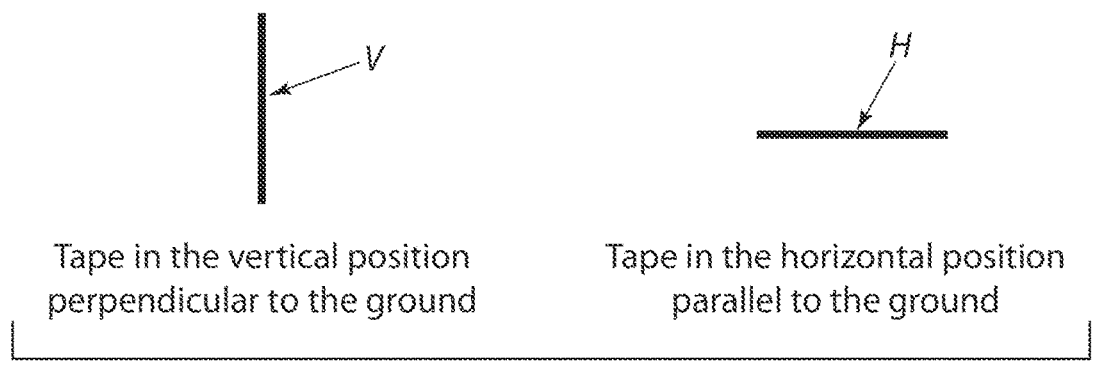
FIG. 2A shows how the tape may be in the vertical position or in the horizontal position.

Each of the tapes 18*a* and 18*b* is run through a runway edge sheave 26. A first runway edge sheave 26*a* is positioned along one edge of the runway and a second runway edge sheave 26*b* is positioned along the other edge of the runway. The runway edge sheave 26 is provided to deflect the tape 18 vertically down the runway. As background, a standard sheave receives and aligns tape vertically. If determined to be acceptable for proper tracking, a standard vertical sheave may be used when the setback between the braking system 14 and the runway is relatively small or close. Typically in this instance the braking system in installed below ground. Installations with a small setback are typically installed with the brake system stored below ground because this type of installation has a slope that is easier to properly track. Instances where the setback is a greater distance, the braking system is installed above grade or at surface level. In this instance, a horizontal sheave can be installed to deflect the tape for proper tape tracking. When a system has a further setback, the brake system is typically stored above ground or at surface level. This will typically cause the tape to enter the runway edge sheave at a small or shallow angle. This shallow angle can make it harder to properly track the tape in order to achieve an optimum tape target. As illustrated by FIG. 2A, a vertical sheave (V) maintains the tape in a vertical position, i.e., perpendicular to the ground, whereas a horizontal sheave (H) maintains the tape in a horizontal position, i.e., parallel to the ground.

Figure 2B:
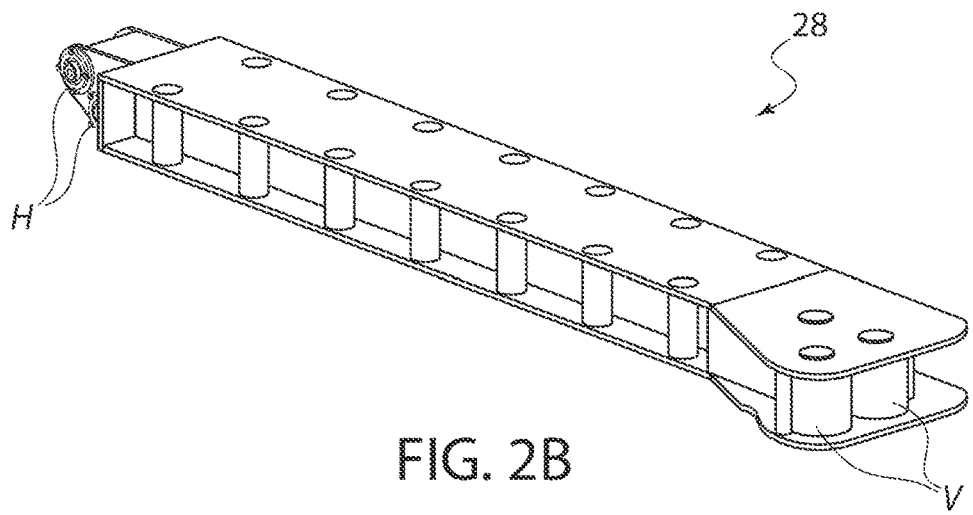
FIG. 2B illustrates a Fairfield Beam of the prior art, which incorporates both vertical sheave rollers and horizontal sheave rollers.

As background, most aircraft arresting systems currently use an energy absorbing braking system with a choice of runway edge sheaves types. There are currently two primary styles of runway edge sheaves. The first type uses only vertical rollers that allow the tape to deflect vertically down the runway during an engagement. This runway edge sheave does not have an adjustment for horizontally deflecting the tape for tape tracking adjustment. The second type of runway edge sheave is referred to as a Fairlead Beam 28, one example of which is illustrated by FIG. 2B. A Fairlead Beam is a one-piece component with vertical rollers (V) on the front runway end of the component and two horizontal rollers (H) on the rear end of the component. The horizontal rollers on the Fairlead Beam are used to redirect elevation for proper tape tracking. The problem with the current Fairlead Beam is that it is a one-piece solution that cannot be easily retro-fitted into an existing system.

Figure 2C:
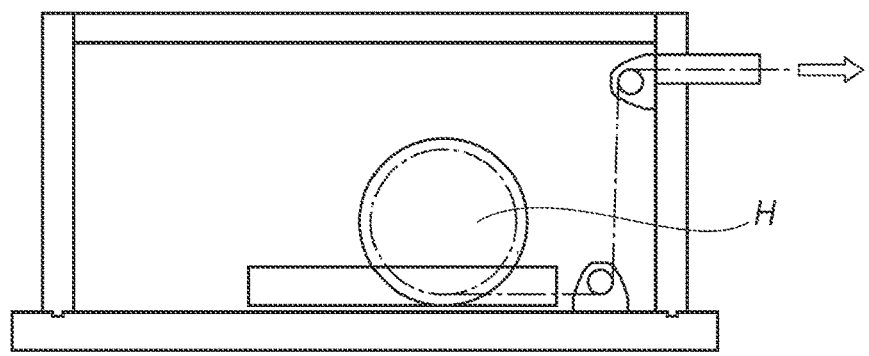
FIG. 2C illustrates a type of sheave designed primarily to be installed in a pit on both the floor and the wall.

There is also provided a deflector sheave that may be installed in connection with some aircraft arresting systems. This type of sheave is designed primarily to be installed in a pit on both the floor and the wall. This sheave is used to deflect the direction of a tape as it exits the braking system/energy absorber. It includes a single horizontal roller (H) that does not prevent the tape from lifting up off of the roller during the dynamic wave of an aircraft engagement. This single roller horizontal sheave is used away from the runway edge sheave and outside of the area where the dynamic wave is potentially more prominent. One example is illustrated by FIG. 2C.

On typical installations, the braking system 14 and the runway edge sheave 26 are aligned and installed at designed elevations, so that the tape 18 pays out from the tape reel 16 through the runway edge sheave 26 and to an optimal height above the center of the runway 22. This alignment provides an optimal tape tracking. "Tape tracking" is the alignment of the tape 18 through three (or more) points. Point one is the center location of the tape 18 exiting the tape reel 16. Point two is the center location of the tape 18 as it passes through the runway edge sheave 26. Point three is the center location of the tape 18 at a designed height above the center crown of the runway 22. Optimal tape tracking is when all points align, such that the center location of the tape 18 aligns with the designed height above the center crown of the runway. Once the aircraft engages the cable or net, it pulls the tape 18 off of the tape reel 16, thus allowing the energy absorbing braking system 14 to stop the aircraft without damage to the tape 18. However, current challenges in using the above-described sheave systems do not always adequately address tape tracking issues.

The disclosed tape elevation adjustment device 10 is intended to address misalignment of the tape 18 along a vertical axis and is intended for use in managing tape elevation for both new and existing systems. For example, there are instances when a new or existing installation requires a horizontal redirect of the tape 18 between the brake system 14 and the runway edge sheave 26. A redirect of the tape would be needed to achieve proper tape tracking. Proper tape tracking is needed for permanent, semi-permanent, and mobile arresting gear installations. Over time or from improper installation, the tape tracking of a system can be misaligned. In the past, this would require an adjustment of the installed system, which is not always feasible or possible. As background, in these arresting systems, the runway edge sheave and anchoring are grouted in place, thus locking them in. One method of adjustment would require breaking out the grout and realigning the sheave. This requires a good deal of labor and also risks damaging the runway edge sheave. In some cases, if the horizontal misalignment is great enough, the foundation may need to be demolished and replaced.

The disclosed tape elevation adjustment device 10 is thus used as part of an aircraft arresting system 12 with the purpose of horizontally redirecting the tape. The device 10 may be used with a standard aircraft arresting system braking system 14 and runway edge sheave 26. The disclosed device 10 may be used as a stand-alone feature that can be retro-fitted into an existing permanent, semi-permanent, and mobile arresting gear installation. Alternatively, it may be used as part of a new system installation where tape tracking will prove as a challenge. Currently, the only solution would be the use of a Fairlead Beam for new installations. However, in conjunction with the disclosed tape elevation adjustment device 10, a standard vertical roller runway edge sheave 26 can be used in lieu of the Fairlead Beam (which is currently the primary option for ensuring proper tape tracking). By using the disclosed tape elevation adjustment device 10, it is possible to continue to use a standard vertical runway edge sheave configuration, and add the tape elevation adjustment device 10 to the vertical runway edge sheave configuration when required.

Figure 3:
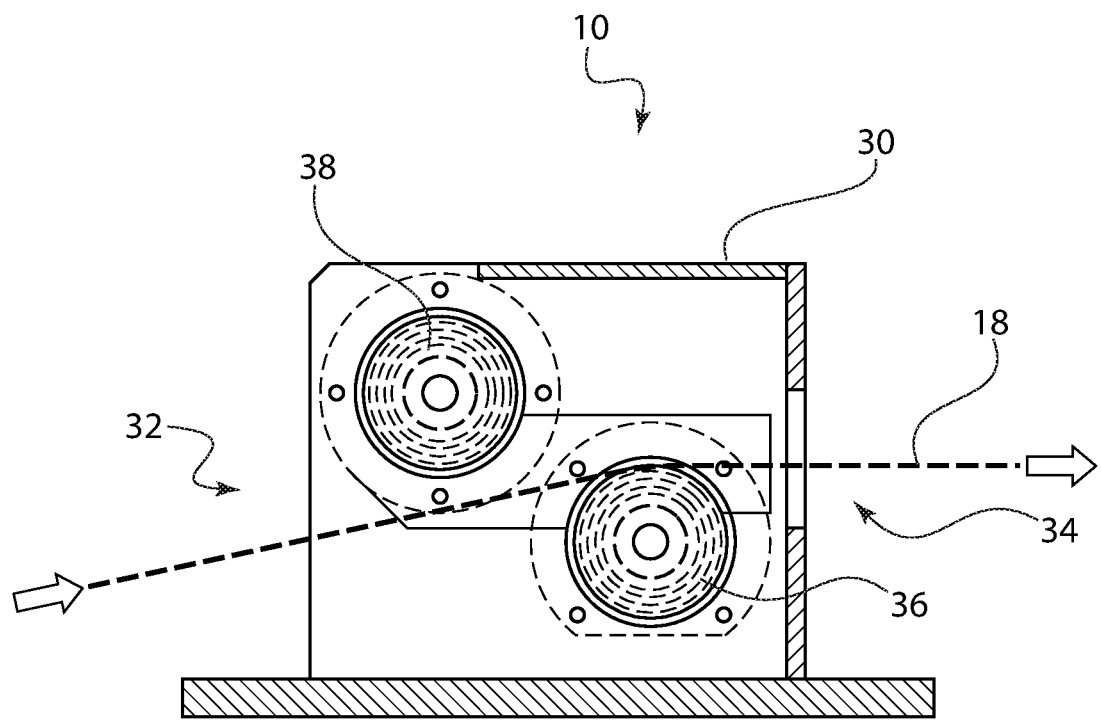
FIG. 3 illustrates a side plan view of one embodiment of a tape elevation adjustment device described herein.

Referring now to FIG. 3, one embodiment of the tape elevation adjustment device 10 provides a way to adjust the elevation of the tape 18. It includes an assembly housing 30 with a tape entrance area 32 and a tape exit area 34. The tape entrance area 32 is on the rear of the housing 30, nearest the energy absorbing braking system 14/tape reel 16 side. The tape exit area 34 is on the front of the housing 30, nearest the runway edge sheave 26 side. Within the housing 30 is a first horizontal sheave roller and a second horizontal sheave roller. In the example shown, the first horizontal sheave roller is a lower horizontal sheave roller 36 that deflects the tape 18 as it pays out across the roller 36. To satisfy loading requirements, the lower horizontal sheave roller 36 may have a diameter in a range of about one inch to about 24 inches. The housing 30 also supports a second horizontal sheave roller, shown as an upper horizontal sheave roller 38, that prevents the tape from lifting up off of the lower roller 36 and causing damage to the housing enclosure 30 as well as the tape 18. This tape movement can occur during the dynamic wave caused by the aircraft engagement. The upper horizontal sheave roller 38 may also have a diameter in a range of about one inch to about 24 inches. It is possible for the rollers 36, 38 to have the same or similar diameters. Alternatively, it is possible for the rollers 36, 38 to have differing diameters, depending upon loading requirements.

The housing 30 can also be provided with a mounting plate 40 that is configured to anchor the tape elevation adjustment device 10 to a permanent, semi-permanent, or mobile installation. The mounting plate 40 has an upper surface that is secured to the housing 30 and a lower surface that is securable to the desired mounting surface. In one example of a permanent and semi-permanent installation, the mounting plate 40 may be anchored to a concrete foundation.

Figure 4A:
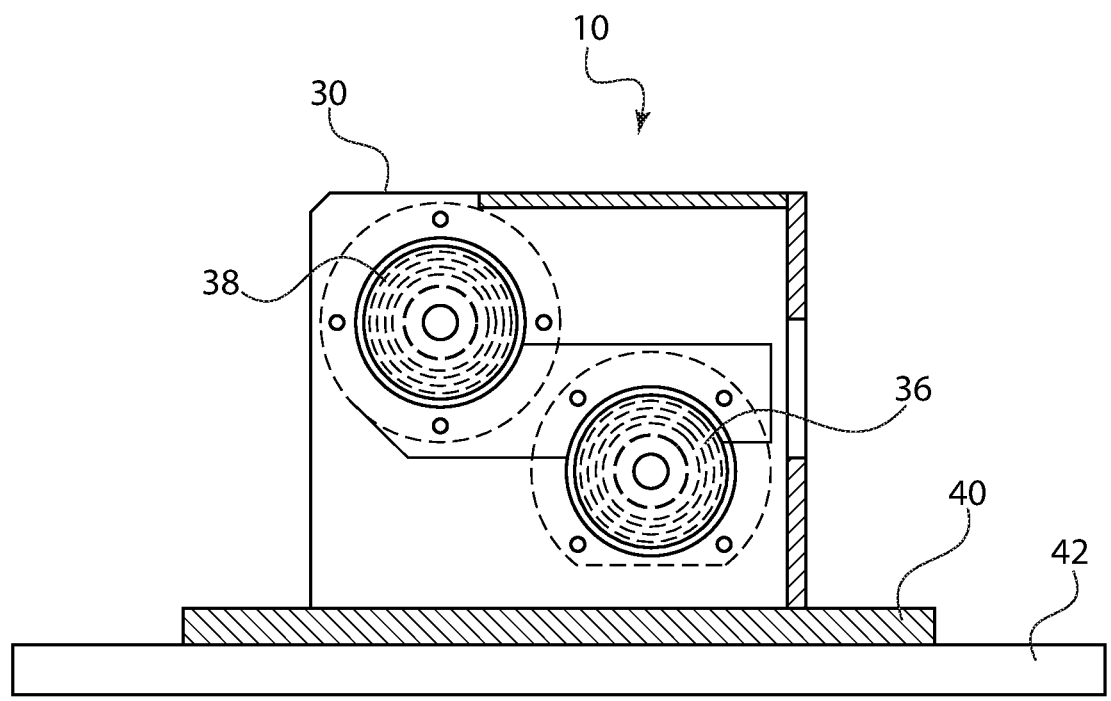
FIG. 4A illustrates a side plan view of the device of FIG. 3 with a separate anchoring feature.
Figure 4B:
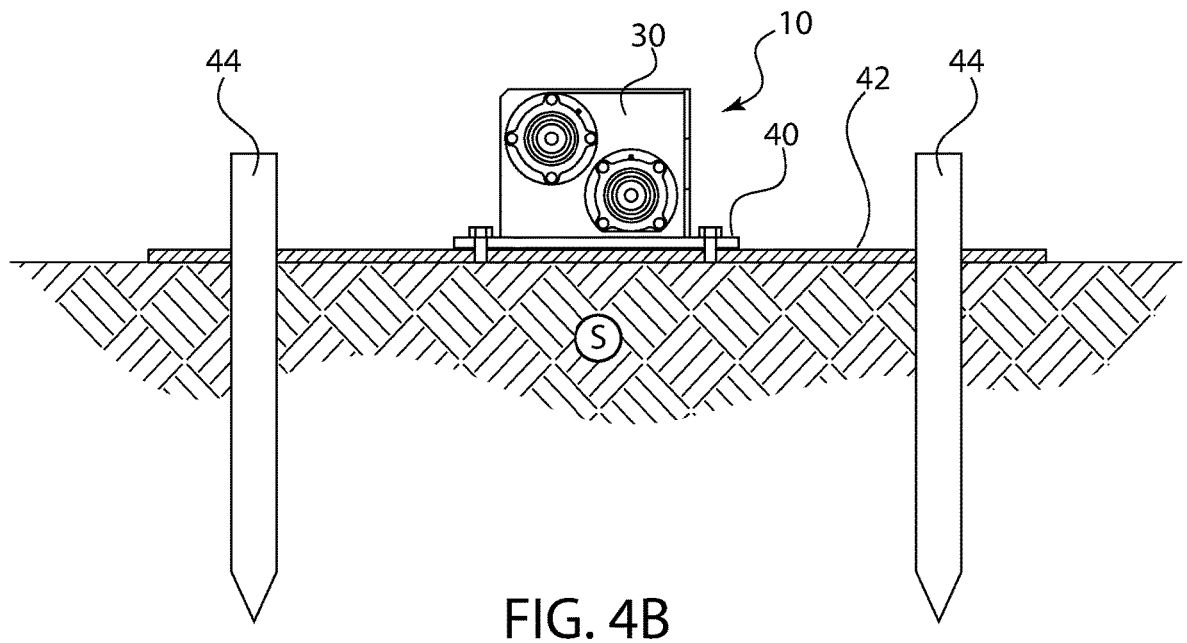
FIG. 4B illustrates the device of FIG. 4A mounted with respect to a soil surface.

In a mobile installation, the mounting plate 40 may be attached to a separate anchoring feature 42 that can be anchored to the soil. FIG. 4A illustrates a separate anchoring feature 42, positioned below the mounting plate 40. FIG. 4B illustrates the housing 30, mounting plate 40, and separate anchoring feature 42 being positioned on a soil surface S. In this example, the separate anchoring feature 42 is a soil install mounting plate used in connection with one or more stakes 44. The stakes 44 are received by the soil install mounting plate and secure the device 10 with respect to the soil S.

Figure 5:
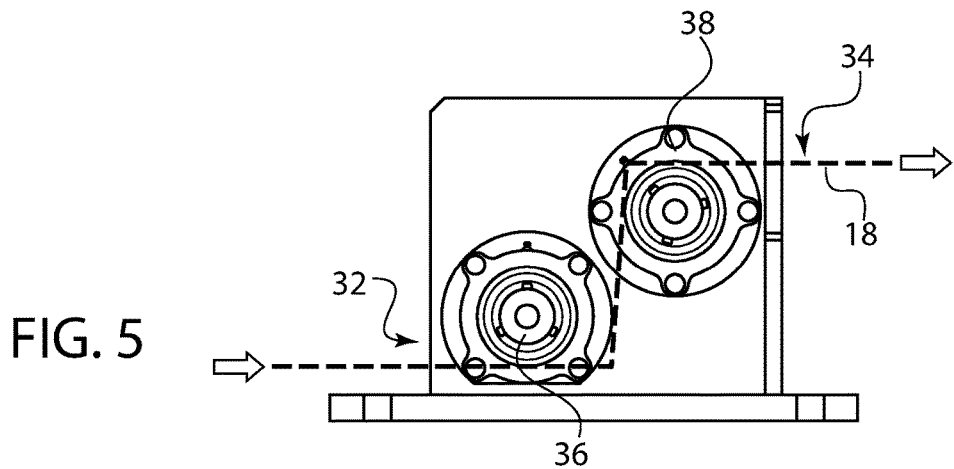
FIG. 5 illustrates a side plan view of a tape elevation adjustment device having a different horizontal sheave roller configuration.

The upper and lower horizontal sheave rollers 36, 38 may be re-arranged to suit multiple requirements. For example, FIGS. 3 and 4 illustrate the upper roller 38 being closest to the tape entrance area 32 and the lower roller 36 being closest to the tape exit area 34. Alternatively, as illustrated by FIG. 5, the lower roller 36 may be closer to the tape entrance area 32 and the upper roller 38 may be closer to the tape exit area 34.

Figure 6:
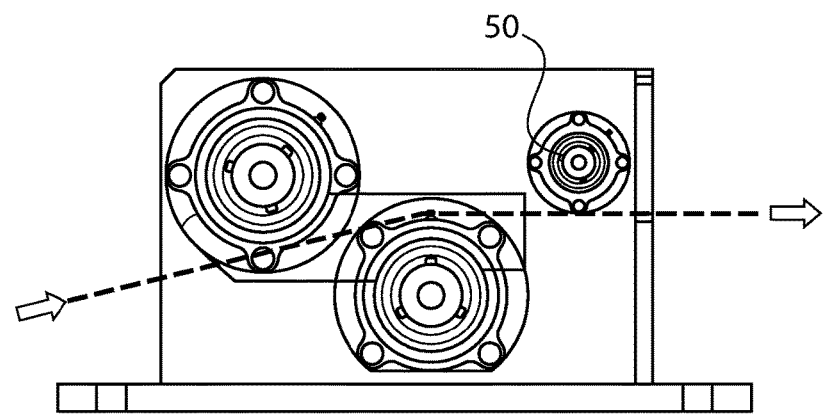
FIG. 6 illustrates a side plan view of a tape elevation adjustment device that incorporates a third horizontal sheave roller.

In addition to the lower and upper rollers 36, 38, it is also possible to provide one or more additional rollers. It is generally understood that providing two horizontal sheave rollers may be more economical, but in some examples, it may be desirable to route the tape differently. One example of an alternate tape route provided by an additional roller 50 is illustrated by FIG. 6. In this example, three horizontal sheave rollers 36, 38, 50 are used in the configuration, allowing the tape 18 to be routed through the sheaves accordingly. It should be understood that although two or three horizontal sheave rollers are shown and described, it is possible to add additional further sheave rollers. For example, if additional tape direction is desired, a fourth sheave roller may be added. If further additional tape direction is desired, a fifth sheave roller may be added, and so forth.

Figure 7:
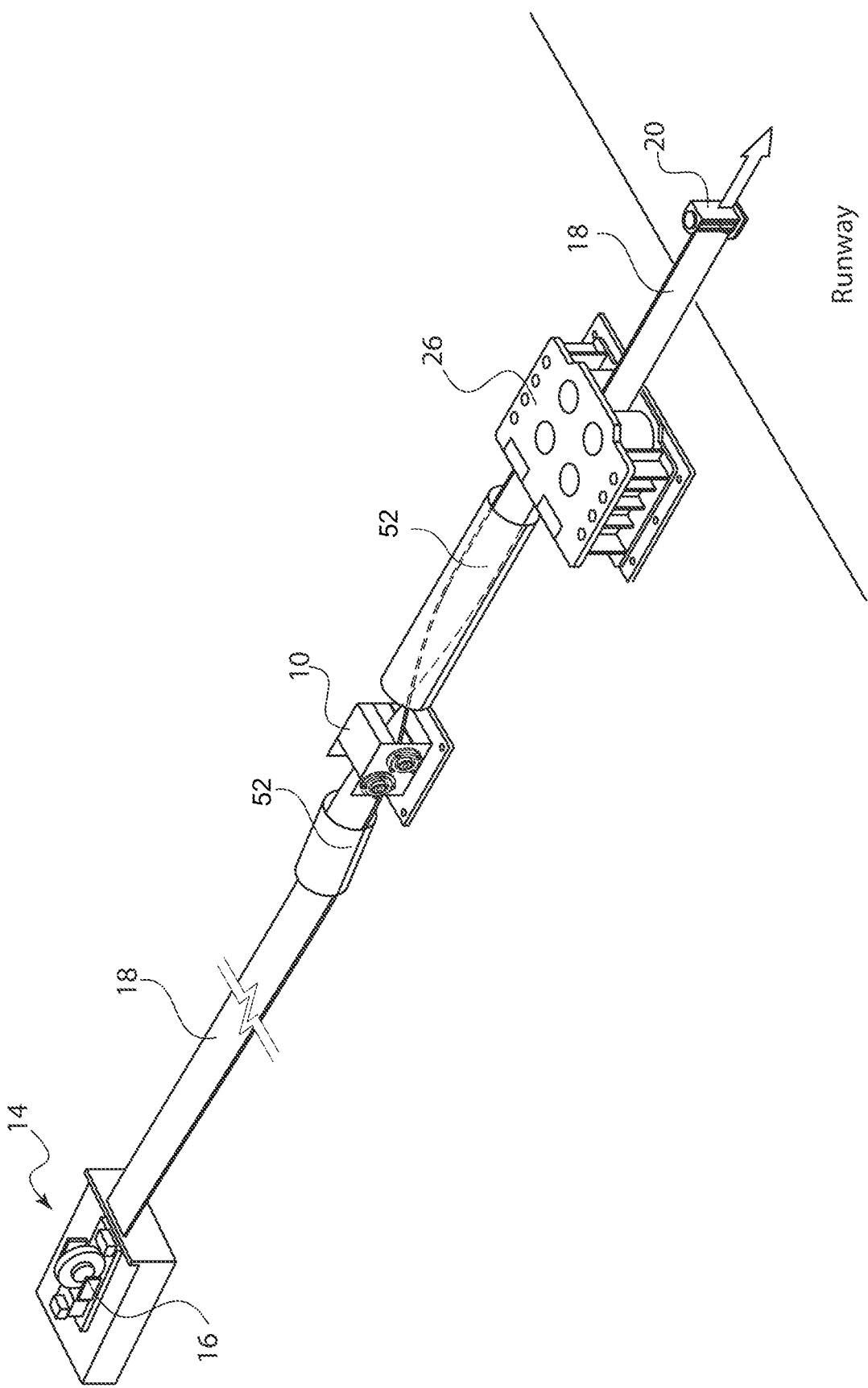
FIG. 7 shows a side perspective view of an aircraft arresting system 12 that incorporates a tape elevation adjustment device between the energy absorbing brake system and the runway edge sheave.

FIG. 7 illustrates one example of a tape elevation adjustment device 10 in use. The energy absorbing braking system 14 is generally positioned to the side and away from a runway surface. The tape 18 has its first end wound around the tape reel 16. The tape 18 is shown exiting the braking system 14 horizontal to the runway surface. Next in the system is the tape elevation adjustment device 10. This device 10 has at least two horizontal sheaves, one of which receives the tape 18 and a second of which changes the elevation of tape 18, such that the tape leaves the tape elevation adjustment device 10 at a different height or elevation than at which it entered. The tape 18 may then be directed toward an existing or standard runway edge sheave 26. As is shown, the tape exiting the runway edge sheave 26 is turned vertically. The second end of the tape 18 is secured to a cable 20 via an appropriate joiner or connector. This figure also illustrates the tape 18 extending through fairlead tubes 52.

Figure 8:
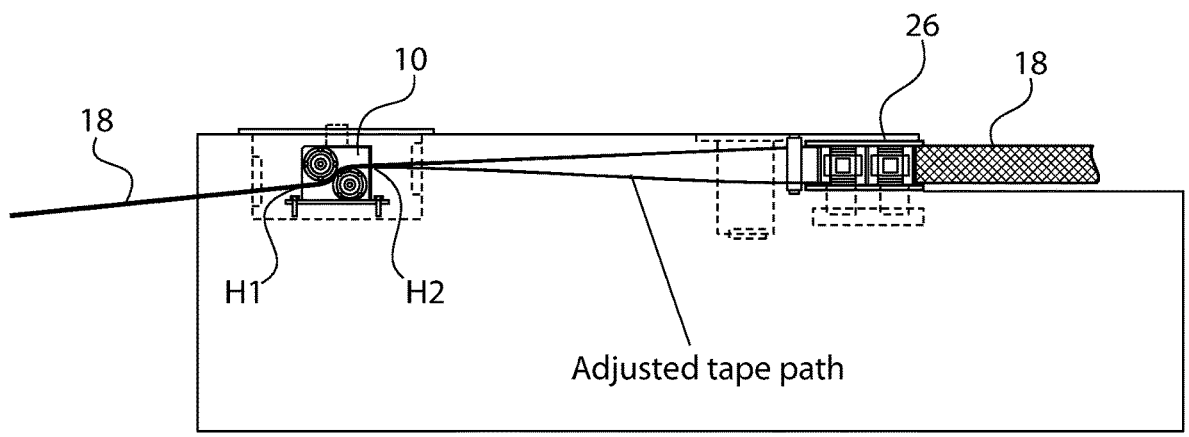
FIG. 8 shows a side plan view of a portion of the aircraft arresting system of FIG. 7, showing how the tape elevation adjustment device changes the elevation of the tape between its tape entrance area and its tape exit area.

FIG. 8 shows a side view of a portion of the configuration of FIG. 7. This figure shows the existing tape path upon entry to the tape elevation adjustment device 10. The tape 18 enters the device 10 at a first height (H1) and exits the device at a second height (H2). This allows adjustment and alignment of the tape without reconfiguring any other system components, but by simply inserting a tape elevation adjustment device 10 at the appropriate position in the system. Once the tape 18 leaves the tape elevation adjustment device 10, it may be caused to turn vertically due to an existing runway edge sheave 26. To obtain proper tape tracking, the horizontal tape 18 at second height (H2) exiting the tape elevation adjustment device 10 is aligned to the center of the existing runway edge sheave 26 vertical rollers. The general goal is to have the center of the horizontal tape at H2 be aligned with the center of the vertically oriented tape as it enters the runway edge sheave.

It should be understood that various different features described herein may be used interchangeably with various embodiments. For example, if one feature is described with respect to particular example, it is understood that that same feature may be used with other examples as well.

Changes and modifications, additions and deletions may be made to the structures and methods recited above and shown in the drawings without departing from the scope or spirit of the disclosure or the following claims.

What is claimed is:

1. A tape elevation adjustment device for use with an aircraft arresting system that has a braking system and a runway edge sheave positioned at each aircraft runway edge, the tape elevation adjustment device being mounted between the braking system and the runway edge sheave and comprising:
   a housing;
   a tape entrance area nearest the braking system that receives tape from the braking system and a tape exit area nearest the runway edge sheave through which exiting tape leaves toward the runway edge sheave;
   a first lower horizontal sheave roller positioned within the housing nearest the tape exit area;
   a second upper horizontal sheave roller positioned within the housing nearest the tape entrance area, wherein the first lower horizontal sheave roller is offset and spaced apart from the second upper horizontal sheave roller;
   wherein tape entering the tape entrance area contacts the first lower horizontal sheave roller and is deflected upward as the tape pays out across the first lower horizontal sheave roller, wherein the second upper horizontal sheave roller only contacts the tape in order to prevent the tape from lifting off of the lower roller during a dynamic wave, wherein the tape enters the tape entrance area at a first lower elevation and exits the tape exit area at a second higher elevation.

2. The device of claim 1, wherein the tape travels between the first and second horizontal sheave rollers.

3. The device of claim 1, wherein the first lower horizontal sheave roller functions to adjust elevation of the tape and redirect a path of the tape.

4. The device of claim 1, wherein the tape elevation device is positioned between the braking system and the runway edge sheave, wherein the device provides the ability to adjust inclination of the tape with respect to the braking system and the runway edge sheave.

5. The device of claim 4, wherein the tape is twisted from horizontal to vertical at any point between the energy absorbing braking system, the tape elevation adjustment device, and the runway edge sheave.

6. The device of claim 1, further comprising a mounting plate.

7. The device of claim 6, further comprising an additional anchoring feature configured to be anchored to soil for a mobile installation.

8. The device of claim 7, wherein the additional anchoring feature comprises a soil install mounting plate and one or more stakes.

9. The device of claim 1, wherein the device is retrofitted into an existing aircraft arresting system by positioning the tape elevation adjustment device between an existing energy absorbing braking system and an existing runway edge sheave.

10. The device of claim 1, wherein the device is installed into a new aircraft arresting system.

11. The device of claim 1, wherein the first horizontal sheave roller and the second horizontal sheave roller have the same diameter.

12. The tape elevation adjustment device of claim 1, positioned before a runway edge sheave with vertical rollers, wherein the tape exits the tape elevation adjustment device at a horizontal H2 and is vertically oriented as it enters the runway edge sheave, wherein a center of the horizontal tape at H2 is aligned with a center of the vertically oriented tape as it enters the runway edge sheave.

* * * * *